Figure 1:
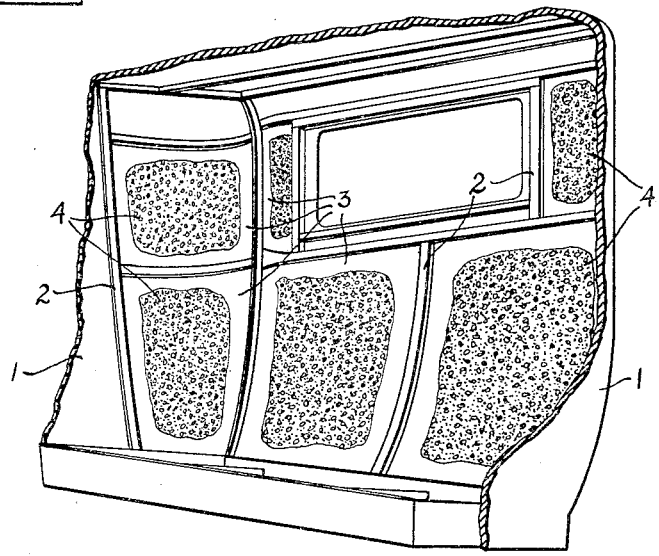

June 20, 1933.  G. B. DUNFORD  1,914,912
DEADENING COMPOSITION
Filed May 18, 1929  2 Sheets-Sheet 1

Inventor
George B. Dunford
By Daniel J. Mayne
Attorney

June 20, 1933.    G. B. DUNFORD    1,914,912
DEADENING COMPOSITION
Filed May 18, 1929    2 Sheets-Sheet 2

Inventor
George B. Dunford
By Daniel V. Mayne
Attorney

Patented June 20, 1933

1,914,912

UNITED STATES PATENT OFFICE

GEORGE B. DUNFORD, OF ST. LOUIS, MISSOURI

DEADENING COMPOSITION

Application filed May 18, 1929. Serial No. 364,046.

This invention relates to automobile bodies having the inside of the metal body shell coated with a plastic deadening composition and more particularly to the deadening composition and the method of applying it to the inside of the body shell.

Most automobile bodies of present day construction are built up from a small number of sections, such as the side, rear and cowl sections which are pressed from relatively thin sheet steel of the desired thickness and secured together by welding or the like into a substantially unitary structure or shell which is reinforced with sills and joists and then finished and upholstered to constitute the completed automobile body. When, however, bodies so constructed as to have panels or expanses of sheet metal, as above referred to, are put into use it has been found that a very objectionable rumble or vibration is set up in those panels, sympathetic with the vibration of the engine, so that the enjoyment of the automobile is materially lessened. This rumble or vibration is more particularly noticeable in the closed type of car, such as the sedan or coupé.

By considerable work upon this subject I have found that the above referred to rumble or vibration can be completely or at least substantially deadened or dampened if, following the construction of the metal body shell with its accompanying sills, joists and braces, the inner side of the metal shell, or at least the panels thereof, are coated with a composition composed largely of bituminous materials and fiber together with other ingredients to facilitate application of the composition. I am aware that it has been previously attempted to deaden vibration in automobile bodies by pasting on the inside of the panels a fiber board which has been formed prior to its application to the body or even by spreading on the panels with a trowel or brush a plastic coating of some kind. Such prior known methods are, however, tedious and expensive and quite unsatisfactory from the standpoint of economy and large scale production.

I have discovered that a composition which is very effective for deadening the vibration and rumble referred to and which can be quite economically applied comprises bituminous materials, a solvent therefor, fiber and clay. Under some conditions a small quantity of water may be added to the composition, although it is preferred not to do so. Much to the surprise of many who have handled bituminous mixtures, I found that the composition perfected by me could be quite economically applied to the inside of an automobile metal body shell by means of a spray gun actuated by air pressure, the spray gun merely having a nozzle suitable for handling my composition rather than paint or other liquids ordinarily sprayed with a spray gun.

My improved composition may be varied somewhat in the proportions of the various constituents used, or various equivalents hereinafter mentioned may be resorted to without departing from my invention as will be apparent to those skilled in the art. The following example is therefore merely illustrative of the manner in which my invention may be carried out.

What may be designated as a bituminous mixture may first be prepared by digesting in a steam jacketed kettle or mixer approximately 10 parts, by weight, of Gilsonite asphalt having a melting point of about 275° F., approximately 12 parts of ordinary petroleum asphalt having a melting point of 190 to 200° F. and approximately 38 or 39 parts of ordinary varnish makers' and painters' naphtha having an initial boiling point of about 190° F. The temperature and time of mixing may be varied somewhat; it is necessary merely to mix until a good solution of the asphalts in the naphtha is obtained; it is preferable that the temperature shall not exceed 185° F.

What may be designated as a hydrocarbon mixture may next be prepared by cooking in a varnish maker's kettle for about an hour and a half at a temperature of about 475° F. approximately 33 parts by weight of cottonseed pitch having a melting point of about 110° F. and about 4 parts of ester gum, namely, rosin which has been esterified by means of lime and glycerine. After proper digestion, the gum and pitch is permitted to cool to about 400° F. whereupon about 2 parts of lead oleate is added and digested therewith for a short time.

What has been above designated as the bituminous mixture and as the hydrocarbon mixture are next thoroughly mixed together at a temperature of about 175° F. thus forming a solution which I will designate as a carbonaceous mixture. When compounded as above described a carbonaceous mixture of approximately 47 to 48 gallons will result. In the claims appended to this application, where the terms bituminous, hydrocarbon or carbonaceous mixture are employed it is intended to define the mixtures above designated broadly by that terminology, such equivalents as I may be entitled to being, of course, included therein. For instance, the quantities and the melting points of the asphalts may be varied somewhat the purpose of using the proportions stated being to add adhesiveness to the composition and to obtain a composition which will not be brittle when cold. Other well known solvents for the asphalts may be used in varied proportions depending upon the final viscosity desired. The ester gum gives to the mixture a sticky texture promoting adhesiveness and the cottonseed pitch gives a mixture that is firm at the higher atmospheric temperatures. Obviously these constituents may be varied as one desires to increase or decrease the property which they contribute to the mixture. The lead oleate acts as a drying accelerator and also may be varied if need be. All such variations depend somewhat upon "conditions on the job" and are subject to the control of those preparing the mixture at the instance of the user thereof as he may desire the properties thereof to be varied.

Into a 47 or 48 gallon batch of the above described carbonaceous mixture is thoroughly incorporated finely ground wood flour of about 20 or 25 mesh and a quantity of long fibered asbestos. While the quantities of these constituents may vary over a fairly wide range, I prefer to employ approximately equal quantities, by weight and to the above batch of carbonaceous mixture would therefore preferably add about 70 pounds each of the wood flour and asbestos. Obviously other vegetable fibers may be employed when cut up sufficiently fine and finely ground paper stock might also be employed. I may also increase the amount of asbestos used and decrease the wood flour or I may do the reverse. The carbonaceous mixture is normally limpid enough to permit the incorporation of the fiber into it although it may be heated slightly if desired.

Into the mixture thus far prepared, I next thoroughly incorporate about 60 pounds (dry weight) of bentonite (colloidal) clay which is a clay that very rapidly takes up liquid and swells to give a slight fluffiness to the mixture. The very surprising thing which I have discovered is that a deadening composition prepared as I have described can be sprayed through a spray gun. It has always been thought that in order to utilize the properties of bentonite or similar colloidal clays that it was necessary to use therewith a considerable quantity of water. Emulsions have been known for many years but no one has known, to my knowledge, that by the mere addition of bentonite to a mixture of carbonaceous materials and fiber a mixture could be obtained which would have the necessary "slip" to be sprayed with a spray gun and yet have sufficient adhesivity to stick to metal and form a tough coating which would not be brittle at lower atmospheric temperatures and which would be sufficiently firm at higher atmospheric temperatures not to flow. I attribute the property of "slip", not only to the colloidal clay but to the asbestos fiber. In some surprising fashion the asbestos fiber gives to my composition sufficient "slip" to permit it to be sprayed, and this without the addition of large quantities of water (or in fact any water) as was heretofore thought necessary in connection with mixtures containing colloidal clay and fiber. The long fiber of the asbestos also contributes to a stronger coating by binding the particles thereof together. A deadening composition compounded as described by me will yield about 75 to 80 gallons of the finished product.

I have found that the incorporation of large quantities of water in the preparation of a composition of this kind has certain drawbacks. For instance, if approximately 25% or more of water is added to the above described composition an emulsion would probably be formed, which would be undesirable, and the composition would be given a false body, drying would be slow and difficulties would be had in colder weather with freezing, and with deterioration. It would therefore be permissible to incorporate in my composition in the neighborhood of 10% or less of water to give a little more slip to the composition, although this is not ordinarily necessary as the asbestos fiber is actually a substitute for any water that might ordinarily be thought necessary to use in a composition of this character.

The apparatus most suitable for the application of my novel composition to the inside of automobile bodies comprises a tank containing the composition and supplied with air pressure of about 50 pounds to the square inch, there being an outlet at the bottom of the tank for conveying the composition through a flexible line to the spray gun. After the sections of the body are united and the bracing thereof is completed, the deadening composition is sprayed upon the inner side of the broad unsupported sections of the body metal known as the panels, such as the door or rear panels. In fact, any portion of the body metal which becomes vibratory during the operation of the car may be coated with my composition. The composition may be applied so as to constitute a layer from a half to one quarter of an inch thick or less. The entire inside of the panel may be coated completely or it may be coated say over the center three quarters or seven eighths thereof leaving a small margin. Various patterns, such as crosses, may be employed to advantage. The composition may be applied thicker at the center of the panel than at the edge thereof. When applied, my composition will dry "dust free" in about five minutes, that is it will skin over. When the volatile constituents have substantially evaporated the composition adheres tenaciously to the body shell, will not flow at higher nor become brittle at lower atmospheric temperatures. Any vibrations which would ordinarily be set up in the operation of the automobile will be quite effectively dampened or deadened so that objectionable rumble will not occur in the operation of the car. I have also found my composition useful in the prevention of rattles and squeaks in the car. By spraying the composition into the cracks and crevices between abutting or closely adjacent braces, joists, etc. used in constructing the body, any vibration therebetween may be minimized.

Figure 2:
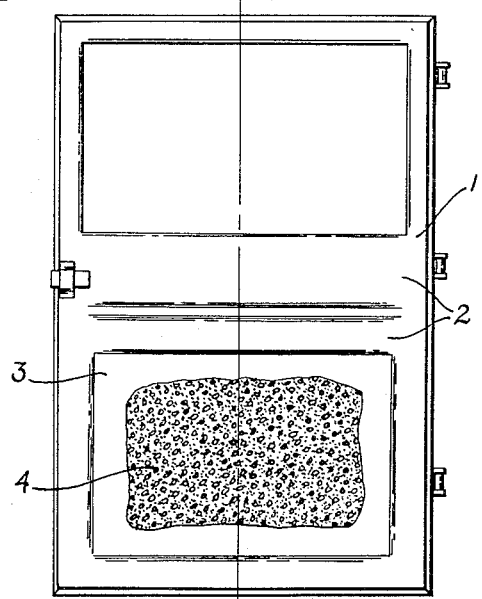
Figure 3:
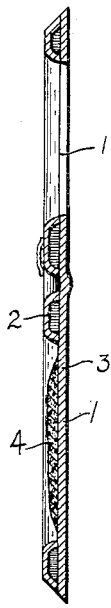
Figure 4:
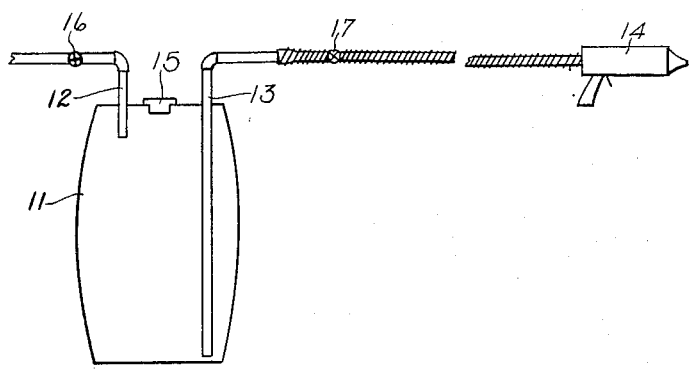

In the accompanying drawings, in which like reference characters refer to like parts, Fig. 1 is a perspective view of the rear portion of an automobile body incorporating my invention; Fig. 2 is an elevation of a door coated with my composition; Fig. 3 is a section taken along the line 3—3 of Fig. 2 and Fig. 4 is a diagrammatic illustration of the spray outfit that may be employed. In Figs. 1 and 3, the thickness of the body metal and of the coating of deadening composition is exaggerated for purposes of illustration.

The reference character 1 indicates the metal of the body which is reinforced by joists, braces or sills 2. Between the joists 2 lie the panels 3 the vibration of which are to be deadened. Upon the panels 3 is sprayed a coating of my composition 4. In Fig. 3 will be noted the manner in which the deadening composition may be tapered if desired so as to save material and still effectively deaden vibration. The spray gun outfit depicted in Fig. 4 may include a container 11 having a compressed air inlet 12 and a composition outlet 13 which is connected to the spray gun 14. An opening 15 is provided for introduction of the composition into the container 11. Valves of any suitable kind may be used where necessary, such as valve 16 for the air line and valve 17 for the composition line to control the flow therethrough. Assuming the valves to be properly set, air pressure applied to the container 11 will force the composition therefrom through outlet 13 to the spray gun 14 by which the composition can be sprayed upon the body metal as herein before described.

My deadening composition has at atmospheric temperatures, approximately the viscosity of heavy machine oil and may quite readily be sprayed cold. It may of course be applied with a brush although that would be tedious and expensive and a step backward rather than a step forward in the art. It may be applied to the bodies after they have passed through the paint drying ovens as heating is not necessary to drive off contained volatile constituents, nor is cooling necessary to cause the setting of my composition as the composition is applied at ordinary atmospheric temperatures. In addition to deadening vibration it will deaden the "bang" which usually accompanies the slamming of automobile doors. It will be apparent that the cost of application of my composition is very small compared to that of other expedients previously tried and that whereas my composition can be sprayed, it would be impossible to spray a mere mixture of bituminous materials, solvent and fiber. Such prior known mixtures have been known for decades but not found useful for the purpose to which my composition is adapted.

It will be obvious that my novel deadening composition may be utilized in a number of ways for the deadening of sound, that is, it may be used upon any sheet metal structure which is subject to vibration or sudden shock such as would produce a "bang" or rattle. For instance, I have found that my deadening composition may be used advantageously upon the under side of theater seats to deaden the sound ordinarily produced when they are folded. Metal partitions may be coated upon the side not exposed to view, to deaden sound when the partition is struck. The inside of filing cabinets may also be advantageously coated to deaden rattle and vibration therein.

Numerous other uses for my novel composition will occur to those skilled in the art and it is intended that those above referred to and those others which will reasonably occur to those skilled in the art shall be included in the claims to the composition appended hereto.

What I claim as my invention, and desire to be secured by Letters Patent of the United States, is:

1. A deadening composition comprising a multiple of approximately 140 pounds of fibers and about 60 pounds of a colloidal clay intimately incorporated into approximately a 48 gallon batch of a carbonaceous mixture which comprises as its principal constituents 2 parts of mineral pitch, 3 parts of a vegetable pitch, 3½ parts of a solvent therefor and less than 10 per cent of water.

2. A deadening composition comprising a multiple of approximately 70 pounds of wood flour, 70 pounds of asbestos fibers and about 60 pounds of a colloidal clay intimately incorporated into approximately a 48 gallon batch of a carbonaceous mixture which comprises as its principal constituents about 2 parts of asphalt, 3 parts of cotton-seed pitch, 3½ parts of a solvent therefor and less than 10 per cent of water.

3. A deadening composition comprising a multiple of approximately 70 pounds of wood flour, 70 pounds of asbestos fibers and about 60 pounds of bentonite intimately incorporated into approximately a 48 gallon batch of a carbonaceous mixture consisting of about 10 parts Gilsonite asphalt, 12 parts petroleum asphalt, 33 parts cotton-seed pitch, 38 parts of naphtha, 4 parts ester gum, 2 parts lead oleate and less than 10 per cent of water.

4. A fluid, sprayable, deadening composition essentially consisting of approximately 2 to 3 parts of asbestos and one part bentonite clay intimately incorporated into approximately 6 parts of a solution composed of about 5 parts of a mixture of mineral and vegetable pitches in about 3 to 4 parts of a high volatile organic solvent, the solution containing less than 10% of water.

5. A fluid, sprayable, deadening composition essentially consisting of approximately 2 to 3 parts of asbestos and one part bentonite clay intimately incorporated into approximately 6 parts of a solution composed of about 5 parts of a mixture of pitches of different melting points in about 3 to 4 parts of a highly volatile organic solvent, the solution containing less than 10% of water.

Signed at St. Louis, State of Missouri this 14th day of May A. D. 1929.

GEORGE B. DUNFORD.